Figure 1:
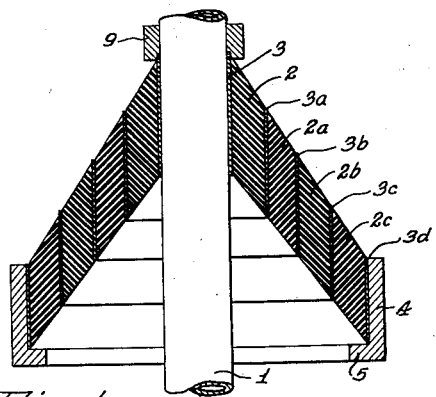

Feb. 2, 1937.   E. H. PIRON   2,069,270
ELASTIC SPRING AND METHOD OF MAKING SAME
Filed May 23, 1935   2 Sheets-Sheet 1

INVENTOR.
Emil H. Piron
BY
ATTORNEY.

Feb. 2, 1937.  E. H. PIRON  2,069,270
ELASTIC SPRING AND METHOD OF MAKING SAME
Filed May 23, 1935  2 Sheets-Sheet 2

INVENTOR.
Emil H. Piron
BY
ATTORNEY.

Patented Feb. 2, 1937

2,069,270

UNITED STATES PATENT OFFICE 2,069,270

ELASTIC SPRING AND METHOD OF MAKING SAME

Emil H. Piron, New York, N. Y., assignor, by mesne assignments, to Transit Research Corporation, New York, N. Y., a corporation of New York Application May 23, 1935, Serial No. 23,046

17 Claims. (Cl. 267—63)

This invention relates to springs of the type wherein an elastic medium, such as rubber, is interposed between concentric load imposing and load receiving members to store energy principally by shear. The primary object is to provide a spring of this type which is suitable for heavy loading with considerable deflection.

Springs of this type as heretofore constructed are generally small in size and the service for which they are called upon is not severe nor variable through very wide limits. There is generally a single problem involved. However, if these springs be merely enlarged for the purpose of receiving loading as herein contemplated it will be seen that many small and unrecognized imperfections become magnified and objectionable to the extent that a complete reorganization is necessary.

For example, if a rubber cylinder is placed between concentric load imposing and load receiving members for straight shear loading, the following drawbacks render it without utility as a main vehicle spring: first, lack of high initial compression in a radial direction will cause the rubber to separate from the load receiving and load imposing member causing a change from day to day in its springing characteristics; second, early destruction as a result of the separation may be expected; third, the large and improperly proportioned bottom and top surfaces result in secondary distortions called "surface effect" which seriously disturb the desired shear load-deflection characteristic, making it impossible to predetermine accurately the deflection of the spring; fourth, through concentration of fatigue overstressing of the rubber in certain regions and understressing of it in other regions because of improper dimensioning deteriorates it rapidly; fifth, there is the use of too much rubber for proper economy due to failure to obtain uniform strain under shear stresses; and sixth, failure as to uniformity in quality of one spring with respect to others built in similar production may be expected.

I am aware that it has been proposed to insert between the rubber above mentioned, additional cylinders of metal. This helps to eliminate bending stresses, but introduces the further problem of uniformly transferring radial compression from one cylinder of rubber to adjacent cylinders. It also introduces the problem of obtaining proper surface bonding.

It is the object of the present invention to provide a spring wherein all of the above drawbacks will be overcome and in which the stated problems are solved.

More specifically, it is an object to provide a spring which will be of long life, which will give a load deflection curve of predetermined value, of sufficient accuracy for all practical purposes, that is, in which bending is practically eliminated; which will have upper and lower surfaces so related with radial and vertical thickness as to impart practically uniform distortion under shear stresses to all regions thereof, and which will depend for accuracy and uniformity of quality in production only on the ability of rubber manufacturers to produce the rubber itself of uniform characteristics.

Another object is to provide a spring of this type having upper and lower surfaces for the rubber which are of generally conical shape and to provide means for storing substantial energy in all of the rubber without ever subjecting the rubber to straight tension in any region that would tend to pull it away from the metallic surfaces to which it is bonded.

Another object is to teach the construction of this spring to obtain a typical shear load deflection curve of any slope, and to teach the manner of altering the shape of this curve to accommodate special conditions. For instance, it is desirable, in some installations, to employ a load deflection curve such that the load deflection ratio of the spring increases as the load increases.

It is a still further object to teach the manufacture of this spring which includes a plurality of rubber, or equivalent, cylinders interposed between a plurality of concentric metallic, or equivalent, cylindrical members in such manner as to obtain proper surface bonding and uniform distribution of rather high initial radial compression without undue localized distortion at any point or region such as might be expected to result from endwise bulging or pinching.

It is a further object to provide means for correcting the characteristics of the spring if desired or as a result of the permanent set which will be taken by the elastic material after a period of operation.

With the foregoing objects in mind there is still considerable latitude in proportion and arrangement, as will be indicated by way of example. In all the cases to be discussed the rubber in any one cylinder is of uniform hardness and the physical proportions are preferably such that the height or axial length varies inversely as the radius or approximately so. The several cases which will be individually explained are, (1)

where the shear area remains constant from cylinder to cylinder, (2) where the shear area increases from cylinder to cylinder radially outwardly, (3) where the hardness of the rubber decreases from cylinder to cylinder radially outwardly, and (4) where any of these constructions are combined with a means to progressively limit the possible deflection of the cylinders for the purpose of varying the load deflection curve to accommodate a given set of computations.

While particular reference has been made to straight shear, the problems of torsional shear in a spring of this type are almost identical and the teachings of one are readily applicable to the problems of the other. Where the term "shear" is employed without qualification it may be understood to mean either torsional or straight unless otherwise qualified.

Another object is to illustrate the manner of applying these teachings specifically to torsion springs.

Figure 5:
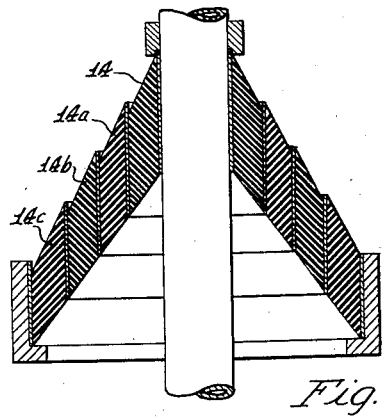
Figure 2:
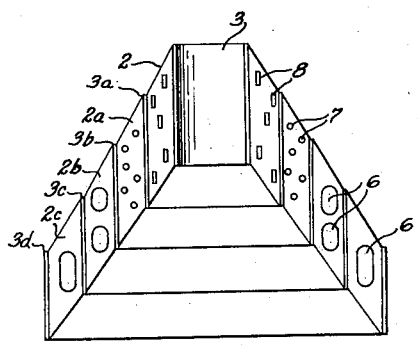
Figure 6:
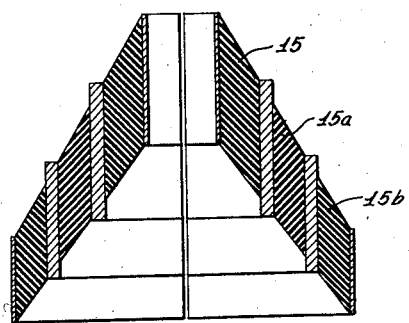
Figure 3:
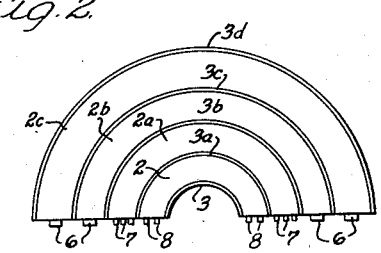
Figure 4:
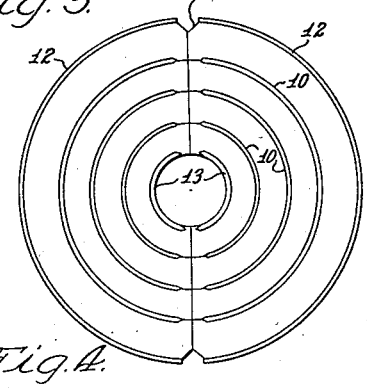
Figure 7:
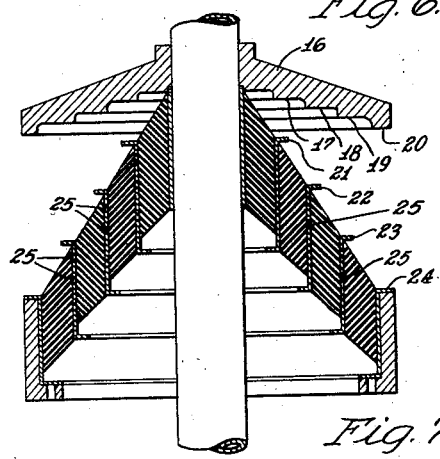
Figure 8:
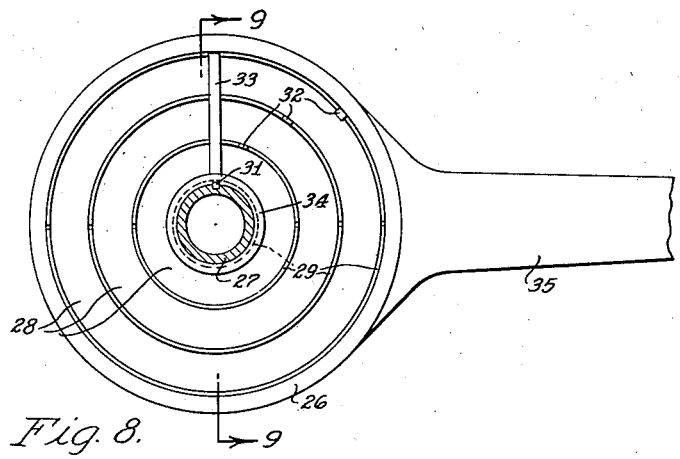
Figure 9:
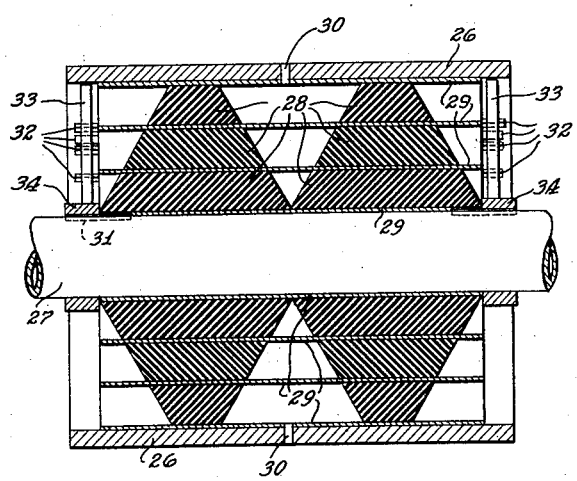

Other objects and advantages will become more fully apparent as reference is had to the accompanying drawings wherein my invention is illustrated and in which Figure 1 is an axial section through my improved spring with load imposing and load receiving members, Figure 2 is a side elevation of one segment of the spring, Figure 3 is a top plan view of the segment of Figure 2, Figure 4 is a top plan view of a modified form of spring, Figure 5 is a section similar to Figure 1 of another modified form, Figure 6 is an axial section of another modification, Figure 7 is a section similar to Figure 1 of a further modification, Figure 8 is an end elevation of a modified manner of utilizing the springs, and Figure 9 is a diametric section taken along the line 9—9 of Figure 8.

I designates a shaft of metal or its equivalent which is encompassed by a plurality of alternate concentric cylinders of rubber, or its equivalent, herein illustrated as being four in number 2, 2a, 2b and 2c, and metal 3, 3a, 3b, 3c and 3d, all of which are concentric with an outer main or retainer cylinder 4. The cylinder 4 is provided with an inturned flange 5. The rubber cylinders are of progressively decreasing height with respect to each other from the inside to the outside and the height or axial length of the inside surface of each is greater than the height or axial length of its outside surface. The rubber may be of uniform hardness throughout all cylinders or may decrease in hardness from one cylinder to the next radially outwardly and the shear surfaces may vary from cylinder to cylinder or may be uniform from cylinder to cylinder.

In order to obtain radial compression in final assembly condition, a uniform transfer of compression from one rubber cylinder to the next, and a proper surface bonding of the rubber and metal, it is advisable to build the springs in segments. While a spring can be divided into any desired number of segments, it has proven satisfactory to use two so that the segments each are constituted of alternate semi-cylinders of metal and rubber. If the faces of the metal and rubber line up on the diametric plane and two segments are fitted together in assembly, it is obvious that the edges of the metal will contact and preclude radial compression of the rubber. On the other hand, if the metal is merely cut back to reduce the metallic members to less than 180 degrees, upon radial compression in assembly of two segments the rubber will flow between the edges of the metal and there will also be a bulging at the upper and lower faces causing undue localized distortion in several regions. For these reasons, the semicylinders of metal are cut back to less than 180 degrees each and the rubber is provided with projections on the faces thereof of substantially less total area than the original area of these faces. These projections may be of any desired form such as ovals 6, buttons 7 or rectangles 8, for instance, and those of one face may be placed to interfit with those of another face. The segments may then be assembled and inserted into the retainer 4 by imposing substantial radial compression. The flange 5 receives the outer metallic segments 3d and the inner metallic segments 3 are compressed on the main member 1. A shoulder 9 fixed to the member 1 serves as a locating stop. With this substantial compression no lower member to correspond to the shoulder 9 is necessary to maintain the cylinder 3 against axial displacement.

A similar effect can be produced in other ways, as for instance, as shown in Figure 4. The bevelled metal members 10 are "immersed" in the rubber and the rubber is cut back at 11 adjacent the opposing edges of the outer member 12. The innermost members 13 are bevelled on one side. The bevelled edges of the metal force the rubber toward each other rather than tending to pinch it.

In order to explain the several possible constructions, consider first any single cylinder of rubber of the type previously defined, that is, one in which the height multiplied by the radius is substantially constant. In other words, the inside area equals the outside area and this relation holds for intermediate shear areas.

As a shear load is applied to the inner surface it is resisted equally and similarly by the outer shear surface so that the unit shear load, which may be called "stress", is uniform. In other words, the total load divided by the total shear area is taken as the stress and this is seen to be uniform throughout any cylinder.

Due to the fact that each cylinder is thin, bending is neglected. The deflection will also be equal in every unit region because the loading is equally and uniformly distributed. The deflection divided by the thickness of the rubber is sometimes called the strain, and with this definition, the strain may be said to be uniform.

Consider now the spring as a whole. If the metallic cylinders 3, 3a, 3b, are of negligible thickness and if the relations specified above for one cylinder hold for all cylinders, the relation of uniform stress will hold true throughout the spring as a whole and the unit deflection (or deflection divided by the thickness) will therefore remain uniform so that the conicities of the upper and lower rubber surfaces will change together under loading. Practically, the stiff or metallic cylinders can not be made of negligible thickness but the same effect can be obtained by bevelling the upper and lower surfaces of the metal or otherwise correcting for the differentials in area as indicated in Figure 5. Here the rubber cylinders 14, 14a, 14b, 14c are stepped with respect to each other to an amount necessary to make the area of the outside shear area of the cylinders 14 equal to the inside shear area of the cylinder 14a, and so on, the inside and outside area of each cylinder also remaining constant or approximately so. However, the spring as thus built will have very little stability in other than axial directions if of larger diameter because the height decreases very rapidly toward the outside.

If the outside area of any cylinder is less than the inside area of the adjacent surrounding cylinder as indicated in Figure 6 then the shear areas increase from one cylinder to the next radially outwardly. Here the inside shear area of one cylinder 15a is considerably larger than the outside area of the cylinder 15 and so on, the shear areas of any one cylinder being substantially constant. With the conditions of Figure 6, under an axial or shear loading the unit shear loading or stress decreases from one cylinder to the next radially outwardly with the result that deflection of a cylinder is greater than that of the cylinder therearound. The capacity of the spring is fixed as the point of maximum deflection for any cylinder and hence only one cylinder will be deflected to a maximum. This spring will, therefore, give varying strain with varying stress and the capacity will be relatively small.

In order to compensate for the non-uniform deflection it is possible to vary the hardness of the rubber from the inner to the outer cylinders, the innermost cylinder having the greatest hardness. The gradation is dependent upon the differential of the areas to be compensated for, and is such that the area multiplied by the modulus of elasticity of any cylinders is equal to the area multiplied by the modulus of elasticity of any other cylinder. In this way the conicity of the top and bottom surfaces of the cylinders can be made to change together so that the maximum deflection of each cylinder can be made to exactly correspond to the maximum deflection of any other cylinder. This spring will therefore give uniform strain with varying stress and the capacity will be greater.

However, if the rubber is kept of uniform hardness throughout all cylinders it is possible to provide stops for limiting the possible deflection of the cylinders beginning with the one subjected to the highest unit loads and progressively preclude deflection beyond this maximum while still permitting the remainder to function. This form is illustrated in Figure 7 in which the stops 17, 18, 19, 20 of the stop plate 15 progressively contact the cylinders 21, 22, 23 and 24. The inside cylinder having the greatest unit shear loading will deflect more rapidly than the next cylinder and hence the stop 17 will contact the cylinder 21 before the stop 18 contacts its cylinder 22, and so on. The strain will therefore be varying until the maximum load is reached whereupon the strain is seen to become uniform.

By choosing the various areas and points of travel at which the cylinders of rubber are taken out of action the load deflection curve may be varied from the typical straight shear curve to a curve which turns upwardly on a new slope following the elimination of each cylinder. The action and construction of this spring are further explained and illustrated in my co-pending divisional application, Serial No. 23,651, filed May 27, 1935.

The stop plate 16 may, if desired, be used with either of the other springs. The results of making various possible combinations may all be computed from the teachings of this case and the application above mentioned.

In manufacturing these springs alternate layers of rubber and metal are placed in a mold and substantial pressure applied during the application of heat. I have found it desirable to perforate the metal shells as at 25 to permit a balancing of pressures throughout all masses of rubber during bonding.

In Figures 8 and 9, the application of the foregoing for torsion springs is indicated. 26 and 27 refer to the main members either one of which may be the load imposing member and the other the load receiving member. The alternate layers of rubber 28 and metal 29 are preferably made up into segments with each complete metallic layer being somewhat less than 360° in circumference in order that substantial pressure may be imposed throughout the rubber. The segments are then placed about the inner member 27 and are then insertable upon the imposition of radial pressure into the outer cylindrical member 26. The outer metallic shell is keyed or otherwise mechanically fixed as at 30 to the member 26 and the inner metallic shell is suitably keyed or otherwise secured as at 31 to the member 27.

The respective areas of the rubber layers may be computed as hereinbefore related so that illustration and description of each variation will not be repeated.

In order that the rubber layers may be progressively taken out of action where one reaches its maximum before the one adjacent thereto, as torsion is imposed by rotation of the arm 35 about the shaft 27, the inside metallic shells 29 are provided with lugs or projections 32 for progressive contact by the arm 33 which, as illustrated, is fixedly secured to the inner member 27 by means of the collar or eye 34. In order that this arm 33 may be a straight member, the shells 29 may each be extended well beyond their rubber contacting length so that the extensions 32 reside in the circumferential path of the arm.

This spring as well as the ones previously described may be constructed in multiple. In Figure 9 the single cylinder 26 houses two springs in series and the metallic elements 29 are common to both. The collars 34 and arms 33 are provided at each end of the spring to prevent twisting.

A number of combinations may now be made by those skilled in the art and I desire to be extended protection within the scope of the appended claims.

What I claim is:

1. A spring comprising cylindrical concentric load imposing and load receiving members having elastic material therebetween and adapted to store energy in shear upon relative axial movement of said members, said material varying in axial length at any concentric cylindrical section substantially inversely with the radius whereby the shear area remains substantially constant throughout said material.

2. A spring comprising cylindrical concentric load imposing and load receiving members having alternate concentric cylinders of elastic material and metal or its equivalent therebetween, each of said cylinders of elastic material varying in height or axial length substantially inversely with the radius whereby the shear area remains substantially constant within any elastic cylinder.

3. A spring comprising cylindrical concentric load imposing and load receiving members having an elastic medium therebetween, the elastic medium being so proportioned as to hardness and physical dimensions that the shear surface multiplied by the modulus of elasticity is substantially constant throughout the radial thickness thereof.

4. A spring comprising concentric load imposing and load receiving members having alternate layers of elastic material and metal therebetween, said layers of elastic material being so proportioned as to physical dimensions and hardness that the shear surface area of any of said layers multiplied by its modulus of elasticity is approximately equal to the shear surface area of any other layer multiplied by the modulus of elasticity of said other layer.

5. A spring comprising concentric load imposing and load receiving members having alternate cylinders of elastic material and metal there between, each of said cylinders of elastic material varying in axial length substantially inversely with the radius whereby the shear area thereof remains substantially constant, said cylinders of elastic material having a shear area and hardness such that the shear area of any cylinder multiplied by its modulus of elasticity is substantially constant for all elastic cylinders.

6. A spring comprising concentric load imposing and load receiving members having alternate cylinders of elastic material and metal therebetween, each of said cylinders of elastic material varying in axial length substantially inversely with the radius whereby the shear area thereof remains substantially constant, said cylinders of elastic material increasing in shear surface from one cylinder to the next radially outwardly, said cylinders of elastic material decreasing in hardness with increasing shear area whereby the unit deflection throughout the spring as a whole is substantially constant under shear loading.

7. A spring comprising concentric load imposing and load receiving members having an elastic material therebetween, said elastic material varying in axial length substantially inversely with the radius, said material being surface bonded to each of said members and under a substantial uniform initial radial compression.

8. A spring comprising cylindrical concentric load imposing and load receiving members having alternate cylinders of rubber and metal therebetween, the composite upper and lower surfaces of the spring being substantially conical and non-parallel.

9. A spring comprising cylindrical concentric load imposing and load receiving members having alternate concentric layers of metal and rubber therebetween, each of said layers of rubber having upper and lower surfaces of conical shape, the composite upper and lower surfaces of all of said layers being substantially conical with similar direction of inclination and non-parallel.

10. In a spring, a plurality of segments each composed of a plurality of alternate layers of rubber and metal, each of said layers when fitted with its companion members constituting less than 360°, each of said layers of rubber when fitted in abutting relation with its companion members constituting at least 360° whereby upon operative assembly said rubber layers are each given a substantial radial compression.

11. In a spring, a pair of segments composed of alternate semi-cylinders of rubber and metal, said semi-cylinders of metal each being substantially less than 180° in circumference.

12. In a spring, a pair of segments composed of alternate semi-cylinders of rubber and metal with the semi-cylinders of metal being slightly less than 180° in circumference and the abutting faces of said rubber cylinders having integral projections of substantially less area than the total area of said faces and in spaced relation with all edges thereof.

13. A spring comprising concentric load imposing and load receiving members having a plurality of alternate concentric cylinders of rubber and metal therebetween with the rubber being under substantial radial compression, said cylinders of metal each being composed of a plurality of segments with their abutting edges in spaced relation whereby the radial compression in any cylinder of rubber is transferred to adjacent cylinders of rubber.

14. A spring comprising a cylindrical inner member, a concentrically arranged cylindrical outer member, alternate cylinders of metal and rubber with metallic interior and exterior cylinders between said members, said metallic cylinders each being composed of segments with the abutting edges in spaced relation after assembly, said cylindrical outer member having a flange member receiving said exterior cylinder as a supporting means, said cylindrical inner member having a shoulder means for contact by said interior cylinder to prevent relative axial displacement thereof, said exterior member being adapted to impose radial compression on said rubber upon assembly of the several parts therein whereby the parts of said interior cylinder are held in compressed assembly against said cylindrical inner member.

15. A spring comprising concentric load imposing and load receiving members having alternate cylinders of metal and rubber therebetween, each of said cylinders of rubber having a substantially constant shear surface within itself, the shear surface of each of said rubber cylinders increasing progressively over the shear surface of the rubber cylinders which it surrounds.

16. A spring comprising concentric load imposing and load receiving members having alternate cylinders of metal and rubber therebetween, each of said cylinders of rubber having a substantially constant shear surface within itself, the shear surface of each of said rubber cylinders increasing progressively over the shear surface of the rubber cylinders which it surrounds, said rubber cylinders each being under a high initial compression with the compression substantially uniform through all of said rubber cylinders.

17. A spring comprising concentric load imposing and load receiving members having alternate cylinders of metal and rubber therebetween, each of said cylinders of metal being composed of segments totalling slightly less than 360° whereby the opposing edges of said cylinders are in slightly spaced relation, the segments of the interior ones of said cylinders each being radially perforated.

EMIL H. PIRON.